United States Patent [19]

Dopfer et al.

[11] Patent Number: 4,515,639
[45] Date of Patent: May 7, 1985

[54] AZO PIGMENT FORMULATIONS

[75] Inventors: Peter Dopfer, Frankfurt am Main; Johann Ostermeier; Siegfried Schwerin, both of Hofheim am Taunus, all of Fed. Rep. of Germany

[73] Assignee: Hoechst Aktiengesellschaft, Frankfurt am Main, Fed. Rep. of Germany

[21] Appl. No.: 346,143

[22] Filed: Feb. 5, 1982

[30] Foreign Application Priority Data

Feb. 7, 1981 [DE] Fed. Rep. of Germany ....... 3104257

[51] Int. Cl.$^3$ ............... C09B 67/00; C09B 67/20; C09B 67/42; C09D 11/02
[52] U.S. Cl. ............... 106/288 Q; 106/23; 106/308 N; 106/308 Q; 106/309; 534/581; 534/747
[58] Field of Search ............... 106/23, 308 N, 309, 106/288 Q; 260/176, 208

[56] References Cited

U.S. PATENT DOCUMENTS 3,827,902  8/1974  Schwerin et al. ............... 106/308 N
4,220,473  9/1980  Robertson ............... 106/23
4,291,112  9/1981  Lu ............... 106/308 N X
4,301,049  11/1981  Funatsu et al. ............... 106/308 N X

FOREIGN PATENT DOCUMENTS 732336  5/1980  U.S.S.R. ............... 106/308 N

Primary Examiner—Floyd D. Higel
Attorney, Agent, or Firm—Curtis, Morris & Safford

[57] ABSTRACT

Intense azo pigment formulations which have good flow and are readily dispersible are obtained on adding a long-chain aliphatic primary amine and a diamine of the formula $$H_2N\text{—}A\text{—}NH_2$$

in which A is an aliphatic hydrocarbon radical having 6 to 30 C atoms, before, during or preferably after the coupling. The formulations are in particular suitable for intaglio printing inks which produce glossy prints which do not even strike through thin papers.

1 Claim, No Drawings

AZO PIGMENT FORMULATIONS

The invention relates to azo pigment formulations which contain a long-chain aliphatic primary amine and a diamine of the general formula I $$H_2N-A-NH_2 \qquad (I)$$

in which A is an aliphatic hydrocarbon radical having 6 to 30 C atoms free from acetylenic linkages.

The invention also relates to a process for the preparation of these formulations, which process comprises adding the long-chain aliphatic amine and the diamine before, during or after the coupling.

Azo pigment formulations according to the invention are very intense, have good flow, are readily dispersible and produce on incorporation into intaglio printing inks glossy prints which do not even strike through thin papers. The invention therefore also relates to the use of the azo pigment formulations in intaglio printing inks.

Preferred embodiments of the invention are explained below in greater detail:

Suitable azo pigments are all products used in intaglio printing inks, in particular pigments of the acetoacetylarylamide series. Disazo pigments, such as C.I. Pigment Yellow 12, 13, 14, 16, 17, 83, 106, 114, 126 and 127, are particularly preferred.

Suitable long-chain aliphatic primary amines are customary industrial fatty amines such as coconut fatty amine, oleylamine, stearylamine or tallow fatty amine and also alkylalkylenediamines of the tallow alkylpropylenediamine type.

German Auslegeschrift No. 1,469,782 has already disclosed that readily dispersible pigments are obtained on adding such long-chain amines to the coupling. However, these products have the disadvantage that intaglio printing inks produced therefrom strike through thin papers.

Suitable diamines of the formula I are in particular those products, the radical A of which has up to 24 carbon atoms. A can be straight-chain or branched and can contain cycloaliphatic rings. Preferred radicals A are:

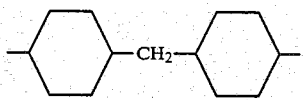

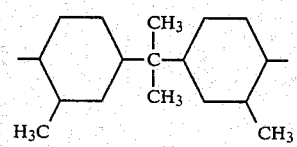

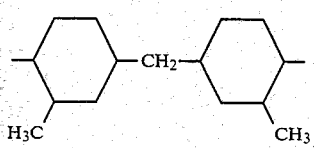

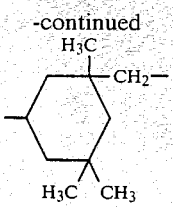

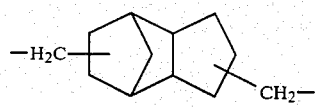

$-(CH_2)_6-$ and $-CH_2-C(CH_3)_2-CH_2-CH(CH_3)-CH_2-CH_2-$

The use of cycloaliphatic amines as an additive in the preparation of azo pigments is already known from German Auslegeschrift No. 1,592,872. However, products thus obtained have an unsatisfactory dispersibility.

The quantity ratio of a long-chain aliphatic primary amine to a diamine of the formula I can vary within certain limits and depends on the properties desired. If ready dispersibility is most important, more of the long-chain amine is used, but if it is required that the printing inks do not strike through, relatively more of the diamine is employed. The most advantageous relations are readily determined by simple preliminary experiments.

In the process according to the invention the amines can be added singly or jointly before, during or after the coupling. It is thus possible to employ the amines as precipitation auxiliaries in the precipitation of the coupling component, to add them after the coupling to the coupling liquor or to use them only at the press cake formulating-stage. The amines can also be added in a subsequent finishing step.

It is in general advantageous to add an emulsifier as a further auxiliary. Suitable emulsifiers are those products which are customarily used for this purpose, such as long-chain amine oxides and phosphine oxides, but advantageously salts of long-chain amines, since these are converted in the alkaline treatment into amines which then act as formulation agents. Such emulsifiers are known, for example, from German Auslegeschriften Nos. 1,173,601 and 1,544,494.

It can also be advantageous to add a cationic compound of the phase transfer catalyst type instead of the emulsifier or in addition to it. Suitable examples are stearyltrimethylammonium chloride and dodecylbenzyldimethylammonium chloride.

The emulsifiers and cationic compounds are employed in commercially customary amounts, namely, for example, up to about 12% of emulsifier, relative to the weight of the coupling component, and up to about 8% of cationic compound, relative to the weight of the pigment. The amount of long-chain aliphatic amine used is preferably 5 to 40%, in particular 10 to 30%, and of a diamine of the formula I 2 to 20%, in particular 4 to 12%, in each case relative to the weight of the pigment.

It is known from German Patent Specification No. 2,121,673 to obtain, via the addition of aralkylalkyleneamines, pigment formulations which produce printing inks which do not strike through on printing thin or low quality papers. Compared to these formulations, products according to the invention have an improved dispersibility and an increased tinting strength.

In the examples below, percentage data are data by weight.

EXAMPLE 1

1012 g of 3,3'-dichloro-4,4'-diamino-biphenyl were stirred together with 6 liters of water and 2.5 liters of 30% strength hydrochloric acid, and the mixture was bis-diazotized to 0° to 15° C. by means of 1052 ml of a 40% strength sodium nitrite solution.

1466 g of acetoacetylaminobenzene were dissolved in 10 liters of water and 800 ml of a 33% strength sodium hydroxide solution, 40 g of oleylamine acetate were added and the coupling component was precipitated by means of 700 ml of 80% strength acetic acid. The coupling reaction was carried out by means of a gradual addition of the bis-diazonium salt solution to the suspension of the precipitated coupling component, during which reaction the pH value was maintained at about 4.5 by means of 6% strength sodium hydroxide solution.

After the coupling was complete, the acidic suspension was heated to 50° C. 50 g of dodecylbenzyldimethylammonium chloride, 250 g of tallow alkylpropylene diamine and 100 g of bis-4-aminocyclohexylmethane were then added. The mixture was heated to 90° to 100° C. and this temperature was maintained for 30 minutes. The mixture was then rendered alkaline by means of 1.5 liters of a 33% strength sodium hydroxide solution and maintained for a few hours at 90° to 100° C. The product was then filtered off, washed, dried and ground.

A readily dispersible formulation of Pigment Yellow 12 (C.I. 21,090) was obtained, from which greenish yellow, intense toluene-based intaglio printing inks having good flow could be produced, by means of which glossy prints were obtained which did not strike through.

EXAMPLE 2

Following the procedure of Example 1, but heating the alkaline mixture not for several hours at 90° to 100° C., but for about 30 minutes at 150° C. in an autoclave, a product having comparable properties was obtained.

EXAMPLE 3

Following the procedure of Example 1, but adding the diamine to the press cake only after the filtration, a product having comparable properties was obtained.

EXAMPLE 4

Following the procedure of Example 2, but adding the diamine only at the press cake stage, a product having comparable properties was likewise produced.

EXAMPLE 5

Following the procedure of Example 1, but employing coconut alkyldimethylamine instead of dodecylbenzyldimethylammonium chloride, a more greenish product was obtained.

EXAMPLE 6

Following the procedure of Examples 1 to 4, but employing one of the other abovementioned cycloaliphatic diamines as the diamine, products having comparable properties were obtained.

EXAMPLE 7

Following the procedure of Examples 1 to 4, but replacing tallow alkylpropylene diamine by oleylamine or tallow alkyldipropylenetriamine, comparable products were obtained.

EXAMPLE 8

Following the procedure of Example 1, but employing a mixture of 1320 g of acetoacetylaminobenzene and 215 g of acetoacetylamino-4-methoxybenzene as the coupling component, a formulation highly suitable for intaglio printing inks was obtained.

EXAMPLE 9

Following the procedure of Example 1, but adding 160 g of oleylamine acetate to the coupling component and adding 150 g of dodecylbenzyldimethylammonium chloride, 750 g of tallow alkylpropylenediamine and 300 g of bis-4-aminocyclohexylmethane to the suspension after the coupling, a pigment formulation having the advantageous properties mentioned in Example 1 was obtained, which formulation however led to reddish yellow, intense toluene-based intaglio printing inks having good flow, by means of which glossy prints were obtained which did not strike through.

We claim:

1. An azo pigment formulation which contains a long-chain aliphatic primary amine selected from the group consisting of coconut fatty amine, oleylamine, stearylamine, tallow fatty amine and diamines of the formula $$alkyl-NH-CH_2-CH_2-CH_2-NH_2$$

wherein said alkyl is of from 14 to 18 carbon atoms, and a diamine of the formula $$H_2N-A-N-H_2$$

in which A is an aliphatic or cycloaliphatic hydrocarbon radical of from 6 to 30 carbon atoms free from acetylenic linkages.

* * * * *